United States Patent [19]

Nelle

[11] Patent Number: 5,142,792
[45] Date of Patent: Sep. 1, 1992

[54] POSITION MEASURING DEVICE

[75] Inventor: Günther Nelle, Bergen, Fed. Rep. of Germany

[73] Assignee: Dr. Johannes Heidenhain GmbH, Traunreut, Fed. Rep. of Germany

[21] Appl. No.: 702,223

[22] Filed: May 17, 1991

[30] Foreign Application Priority Data

May 31, 1990 [DE] Fed. Rep. of Germany ... 9006138[U]

[51] Int. Cl.⁵ .............................................. G01B 7/02
[52] U.S. Cl. ..................................... 33/702; 33/706; 33/DIG. 11
[58] Field of Search ................. 33/706, 707, 708, 702, 33/DIG. 11

[56] References Cited

U.S. PATENT DOCUMENTS

| 3,816,002 | 6/1974 | Wieg | 33/707 |
| 3,816,003 | 6/1974 | Litke | 33/707 |
| 3,942,895 | 3/1976 | Meyer et al. | 33/707 |
| 4,095,903 | 6/1978 | Feichtinger | 33/707 |
| 4,215,480 | 8/1980 | Fisher et al. | 33/706 |
| 4,262,423 | 4/1981 | Affa | 33/707 |
| 4,512,082 | 4/1985 | Burkhardt | 33/706 |
| 4,608,758 | 9/1986 | Voelk et al. | 33/706 |
| 4,982,507 | 1/1991 | Rieder et al. | 33/706 |

FOREIGN PATENT DOCUMENTS

| 2611459 | 9/1977 | Fed. Rep. of Germany . | |
| 0243757 | 3/1987 | German Democratic Rep. | ... 33/706 |

Primary Examiner—Thomas B. Will
Attorney, Agent, or Firm—Anderson, Kill, Olick

[57] ABSTRACT

A position measuring device for measuring the relative positions of two objects. A scanning unit for scanning a graduation carrier is mounted on a bed of a processing machine through a coupling which is stiff in measuring direction. The coupling includes a first coupling part in the form of a plate fastened to the scanning unit and a second coupling part in the form of a pin having a spherical end face. The pin is fastened to an engagement member mounted on the bed of the processing machine. A sliding layer is provided between the two coupling parts in order to eliminate wear between the two coupling parts and to eliminate measuring inaccuracies.

6 Claims, 1 Drawing Sheet

POSITION MEASURING DEVICE

BACKGROUND OF THE INVENTION

1. Field of the Invention

The present invention relates to a position measuring device for measuring the relative positions of two objects. The invention particularly relates to a position measuring device in which the graduation of a graduation carrier connected to one of the objects is scanned by a scanning unit which is coupled in an articulated manner through a coupling which is stiff in measuring direction to the other object or to an engagement member mounted on the other object. The scanning unit is movable on an auxiliary guide means which is independent of the guide means of the two objects. The coupling includes two coupling members which contact each other.

2. Description of the Related Art

Position measuring devices of the type described above are particularly used in processing machines for measuring the relative position of a tool relative to a workpiece to be processed.

In measuring devices with a scanning unit which is guided on an auxiliary guide means which is independent of the guide means of the two objects in the form of machine parts, an articulated coupling to the corresponding object or an engagement member arranged on the corresponding object is indispensible.

German patent 26 11 459 describes a position-measuring device in which a scanning unit for scanning the graduation of a graduation carrier is movable on an auxiliary guide means which is independent of the guide means of the two objects whose relative positions are to be measured and is coupled in an articulated manner to an engagement member through a coupling which is stiff in measuring direction. The first coupling part of this coupling is a plane surface on the scanning unit which is in continuous contact by means of a spring with a spherical surface of the second coupling part on the engagement member.

However, in this known type of coupling, parallel displacements and angular errors between the guide means of the two objects and the auxiliary guide means cause relative movements between the plane surface and the spherical surface and the resulting sliding friction leads to wear of the two coupling parts and, thus, to measuring inaccuracies which can no longer be tolerated in high-precision position measuring devices.

SUMMARY OF THE INVENTION

Therefore, it is the object of the present invention to provide a position measuring device of the above-described type in which wear occurring between the two coupling parts when relative movements take place between the coupling parts and the resulting measuring inaccuracies are eliminted.

In accordance with the present invention, this object is met by providing a sliding layer between the two coupling parts.

The advantages which can be achieved with the abovementioned feature according to the present invention can be seen particularly in the fact that the provision of a sliding layer between the two coupling parts of the coupling ensures that no measurable wear occurs between the two coupling parts when relative movements of the two coupling parts take place, so that measuring inaccuracies can no longer occur.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention

DESCRIPTION OF THE PREFERRED EMBODIMENT

Figure 1:
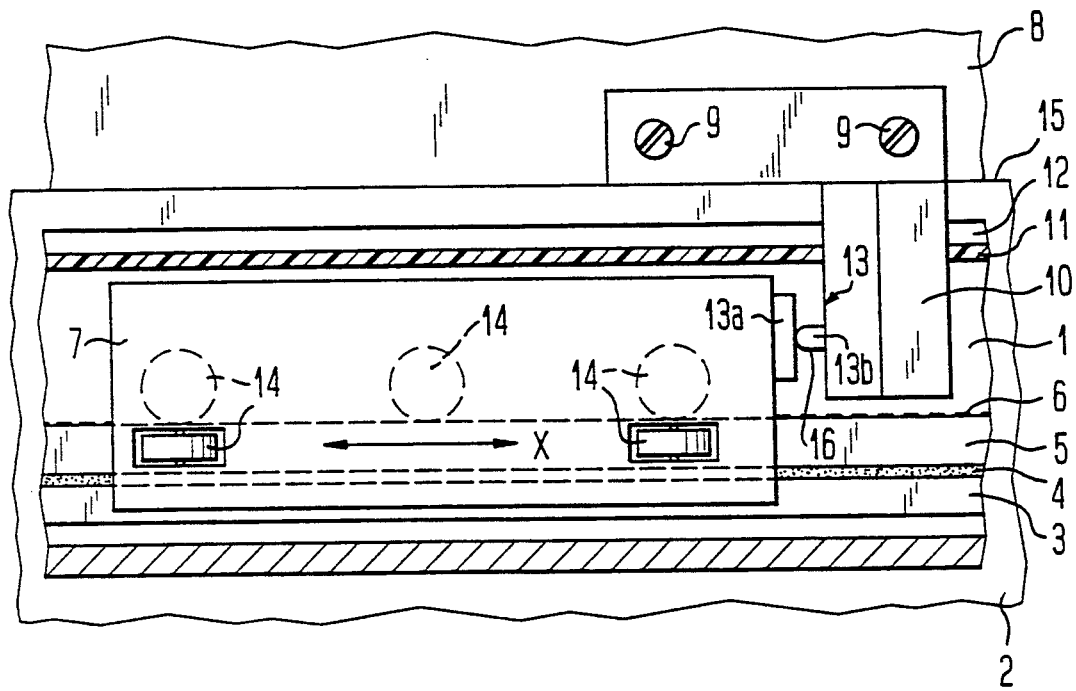
FIG. 1 is a side view, partly in section, of a position measuring device according to the present invention.

FIG. 1 of the drawing is a side view, partially in section, of a position measuring device according to the present invention which includes a housing 1. The housing 1 is fastened in a suitable manner to a processing machine, not shown. A graduation carrier 5 is fastened by means of an adhesive layer 4 on a web 3 in the interior of the housing 1. The graduation 6 of the graduation carrier 5 is scanned by a scanning unit 7 in a known suitable manner.

A double sword-shaped engagement member 10 is fastened by means of screws 9 to a bed 8 of the processing machine. The engagement member 10 extends into the housing 1 through a longitudinal slot 12 which is closed by two sealing lips 11. The engagement member 10 is connected through a coupling 13 to the scanning unit 7. The scanning unit 7 is guided by means of rollers 14 on two surfaces of the graduation carrier 5. The two surfaces of the graduation carrier 5 form an auxiliary guide means for the scanning unit 7 which is independent of the guide means 15 of the carriage 2 relative to the bed 8. The carriage 2 and the bed 8 of the processing machine represent the two objects whose relative position is to be measured in measuring direction X.

The coupling 13 includes a first coupling part 13a in the form of a plane plate fastened to the scanning unit 7. The plate is preferably of hard metal or polished glass. The plane surface of the plate extends perpendicularly to the measuring direction X. The coupling 13 further includes a second coupling part 13b in the form of a pin with a spherical end face. The pin is fastened to the engagement member 10 and extends in measuring direction X.

In accordance with the present invention, a sliding layer 16 is provided between the first plane coupling part 13a and the second spherical coupling part 13b of the coupling 13. The sliding layer 16 may be in the form of a thin sliding foil, for example, having a thickness of 0.1 to 0.2 mm. The sliding foil 16 preferably is of a PTFE-containing plastics material.

Figure 2:
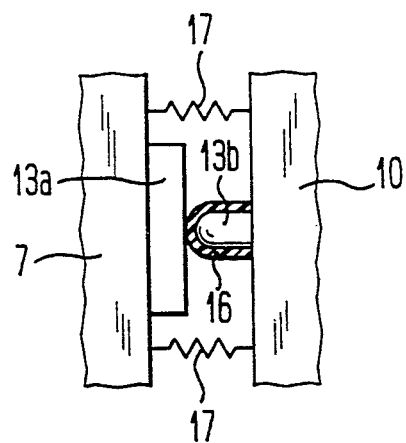
FIG. 2 shows a detail, on a larger scale, of a coupling of the position measuring device of FIG. 1.

FIG. 2 of the drawing shows an enlarged detail of the coupling 13. The spherical end face of the pin of the second coupling part 13b is coated with the sliding layer 16 which is in continuous contact with the plane surface of the first plane coupling part 13a by means of two springs 17 which are fastened to the scanning unit 7 and the engagement member 10.

In accordance with another feature which is not illustrated in the drawing, the first plane coupling part 13a can also be connected to the engagement member 10 and the second spherical coupling part 13b can be connected to the scanning unit 7. The first plane coupling part 13a may also be integrated in the scanning unit 7, so that the end face of the scanning unit 7 forms the plane surface of the first plane coupling part 13a.

In accordance with another feature which is also not illustrated, the sliding layer can also be provided on the plane surface of the first plane coupling part 13a and can be in continuous contact with the spherical end face of the pin of the second coupling part 13b.

While a specific embodiment of the invention has been shown and described in detail to illustrate the application of the inventive principle, it will be understood that the invention may be embodied otherwise without departing from such principles.

I claim:

1. In a position measuring device for measuring the relative positions of two objects, wherein a graduation of a graduation carrier connected to one of the objects is scanned by a scanning unit which is coupled in an articulated manner to the other of the objects through a coupling which is stiff in measuring direction, the scanning unit being slidable on an auxiliary guide means which is independent of a guide means of the two objects, and wherein the coupling includes two coupling parts which contact each other, the improvement comprising a sliding layer between the two coupling parts.

2. The position measuring device according to claim 1, wherein the scanning unit is fastened to an engagement member which is mounted on the other object.

3. The position measuring device according to claim 2, wherein one of the two coupling parts is a plane plate fastened to the scanning unit and the other of the two coupling parts is a pin having a spherical end face fastened to the engagement member.

4. The position measuring device according to claim 3, wherein the sliding layer is a coating of the spherical end face of the pin.

5. The position measuring device according to claim 1, comprising springs for continuously holding the two coupling parts of the coupling in contact.

6. The position measuring device according to claim 1, wherein the sliding layer is of PTFE-containing plastics material.

* * * * *